July 27, 1954  G. A. MORTON  2,685,044
QUANTIZING TUBE
Filed Feb. 5, 1948  4 Sheets-Sheet 1
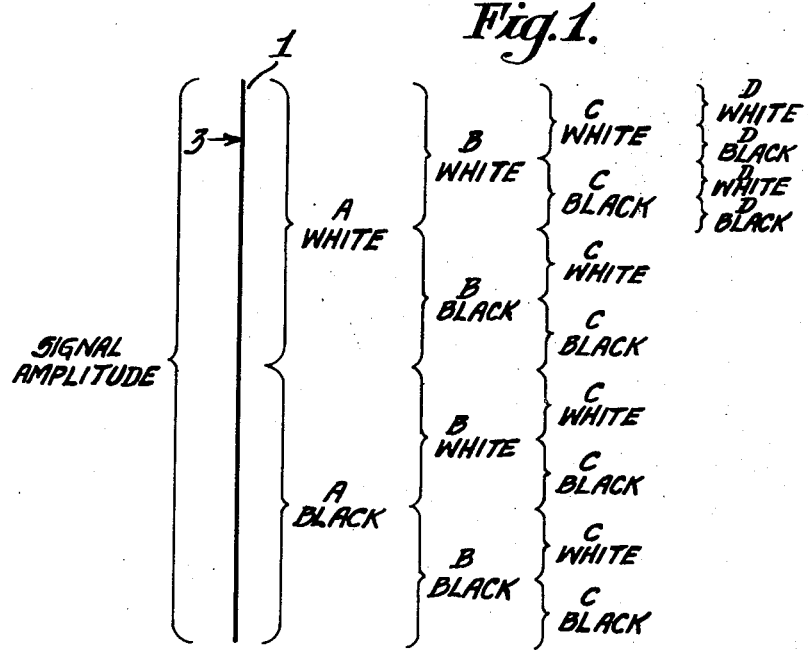
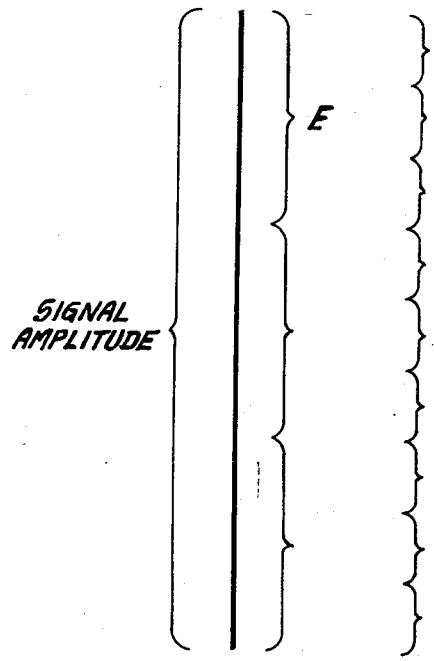
INVENTOR
George A. Morton
BY
ATTORNEY

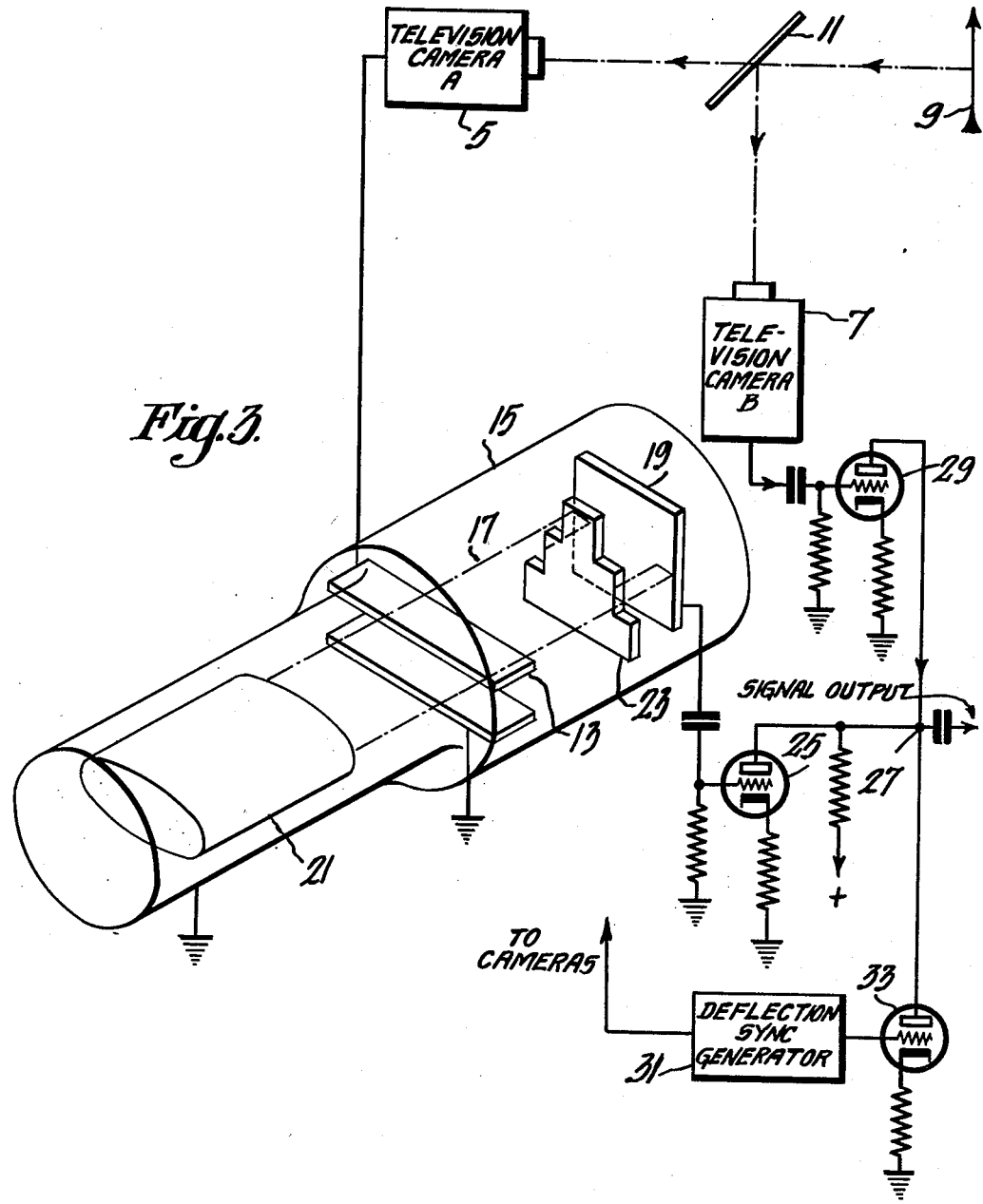

July 27, 1954
G. A. MORTON
2,685,044
QUANTIZING TUBE
Filed Feb. 5, 1948
4 Sheets-Sheet 3
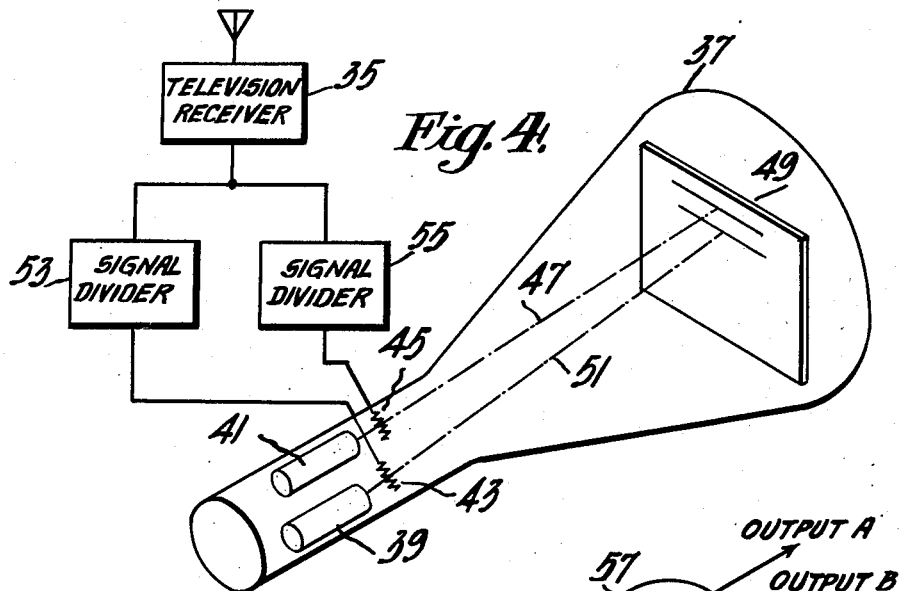
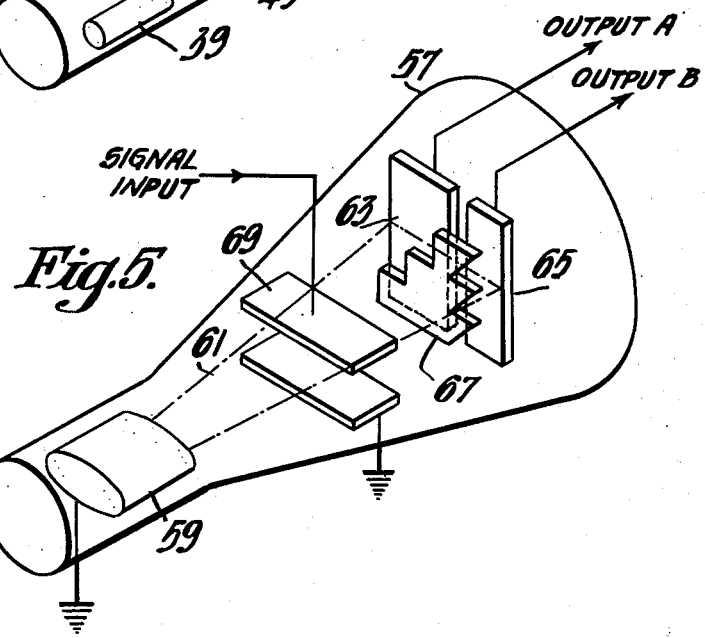
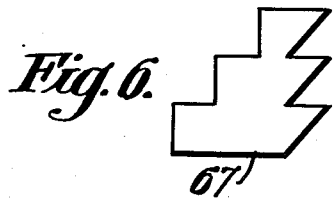
INVENTOR
George A. Morton
BY
ATTORNEY July 27, 1954
G. A. MORTON
2,685,044
QUANTIZING TUBE
Filed Feb. 5, 1948
4 Sheets-Sheet 4
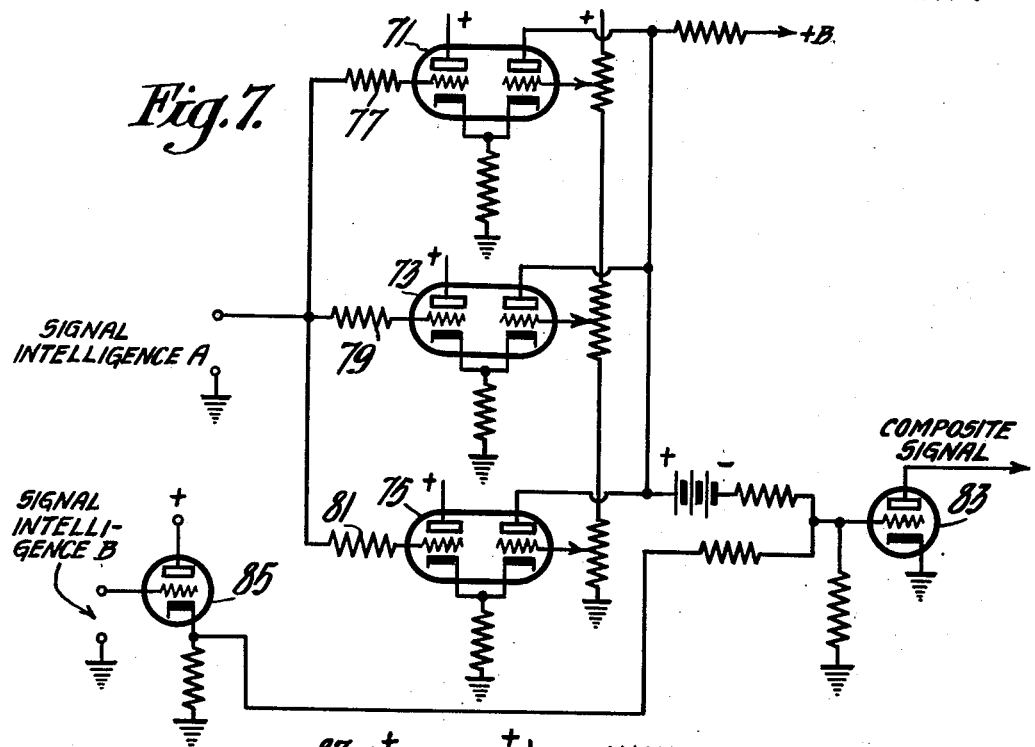
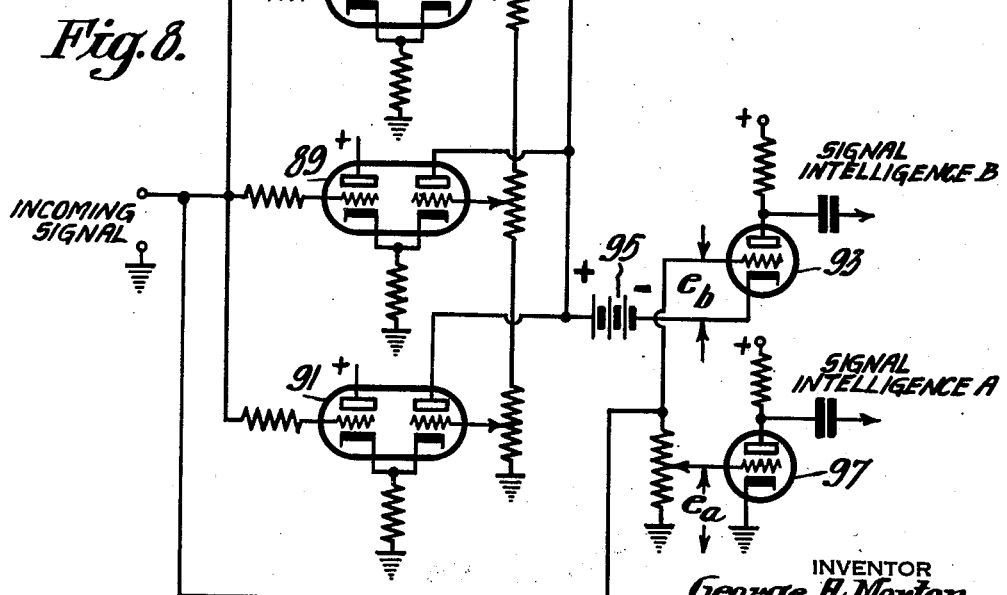
INVENTOR
George A. Morton
BY
ATTORNEY Patented July 27, 1954

2,685,044

UNITED STATES PATENT OFFICE 2,685,044

QUANTIZING TUBE

George A. Morton, Princeton, N. J., assignor to Radio Corporation of America, a corporation of Delaware Application February 5, 1948, Serial No. 6,455

2 Claims. (Cl. 313—72)

This invention relates to signal transmission and more particularly to methods and arrangements for minimizing the signal frequency spectrum required for the transmission of a predetermined amount of intelligence.

According to this invention, a signal amplitude is divided into a predetermined number of designated amplitude values representative of a first intelligence. Each division of the signal amplitude is again divided into a predetermined number of designated amplitude values corresponding to a second intelligence. The process may be repeated for additional intelligences. At the receiving station, the signal amplitude is then resolved to produce individual signal trains representative of each different intelligence.

Although it is not intended that this invention should be limited in application to the transmission of image signals, its operation in one of its forms suitable for image signal transmission will be outlined.

It has been recognized as basic that changes in brightness can be recognized only when the magnitude of change exceeds a certain value. It therefore follows that information sufficiently accurate for observation may be resolved in a series of steps whose magnitude does not exceed the certain value referred to above as the minimum distinguishable change in light value which can be recognized.

In ordinary image signal transmission where a finite number of lines and elements along each line are assumed, the brightness of each element can vary continuously from zero to some limiting maximum brightness. It can be shown that the band width required for transmission is $$f = kNL\frac{1}{T_0}$$

where $T_0$ is frame time
N—number of elements per line
L—number of lines
k—a constant depending upon definition of element and resolution, which, for present purposes, will be taken as unity.

However, if a selected number of steps of brightness is assumed for each element, the above considerations no longer hold, and a smaller band width may suffice.

One approach to the solution of the band width required is as follows. Assume for simplicity that the image consists of two lines each with two elements. Furthermore, assume that the brightness of each element is either 1 or 0.

By ordinary considerations (if the brightness were continuously variable) the band width would be $$f = k\frac{1}{T_0}2 \times 2$$

$$k = 1, \ \frac{1}{T_0} = 30$$

$$f = 120 \text{ cycles}$$

But with two brightness steps, there are at most 16 permutations of the four picture elements— i. e.

| 1 | 0001 | |
|---|------|---|
| 2 | 0010 | |
| 3 | 0011 | This is the binary |
| 4 | 0100 | number sequence. |
| 15 | 1111 | |
| 16 | 0000 | |

Therefore, all possible images can be represented by a single amplitude where the maximum amplitude is capable of a discrimination of 1 part in 16. This amplitude must be capable of being varied 30 times per second (once each frame). Therefore, the band width is $$f = \frac{1}{T_0} = 30 \text{ cycles}$$

If, due to noise or other reasons, the maximum amplitude discrimination is only 1 part in 4, then two amplitudes must be transmitted each frame, to correspond to a number sequence of four stages, i. e.

| No. represented | Amplitude a b |
|---|---|
| 1 |   1 |
| 2 |   1 |
| 5 | 1 1 |
| 7 | 1 3 |
| 8 | 2 0 |
| 15 | 3 3 |
| 16 | 0 0 | where the steps of amplitude are 0 1 2 3 for the transmitted signal. The band width in this case is $$f = \frac{1}{T_0}2 = 60 \text{ cycles}$$

Carrying this to an extreme, if the amplitude discrimination is such that it only permits an off or on signal, four amplitudes are transmitted and the band width is $$f = \frac{1}{T_0}4 = 120 \text{ cycles}$$

which is identical with the continuous system, and it should be noted that under the assumed transmission conditions, the continuous system could only transmit a black-white image, such as a silhouette.

It will be noted that the minimum band width is limited to frame frequency. This limitation is, however, only apparent, for by delaying the picture by a constant amount equal to two frame periods (instead of the usual one frame period), and transmitting the entire information of the two frame ($16 \times 16 = 256$ permutations) by a single amplitude at intervals equal to twice the frame period, the band width is reduced to $$f = \frac{1}{2}\frac{1}{T_0} = 15 \text{ cycles}$$

without loss of repetition rate or definition. In general, with an amplitude discrimination of $16^m$ the band width will be $$f = \frac{1}{m}\frac{1}{T_0}$$

which may be made arbitrarily small.

Considering now the general case of an image of "L" lines and "N" elements per line with each image element permitted "S" steps of brightness, assume that this is to be transmitted (with a frame time "$T_0$" without division of frame frequency) over a frequency channel containing "$b$" amplitude elements per frame time with a discrimination of "C" steps per amplitude element. The following relations among the assumed quantities must exist.

$$S^{(N.L)} = C^b$$

or $$\frac{b}{N.L} = \frac{\log S}{\log C}$$

and $$f = \frac{1}{T_0} \cdot b$$

Now the normal frequency band is given by $$f_N = \frac{1}{T_0} N.L$$

hence $$f = f_N \frac{b}{N.L} = f_N \frac{\log S}{\log C}$$

Thus, it is seen that, irrespective of the number of elements in the image, if the transmission conditions are such that a greater amplitude discrimination can be obtained than the number of brightness steps required of each image element, there is the possibility of reducing band width. (This narrowing is not dependent upon the assumption of discrete steps, but rather on the ratios of the logarithm of the ability to discriminate amplitude to that of desired discrimination of brightness.)

In the expression $$f = f_N \frac{\log S}{\log C}$$

the amplitude steps can be expressed as $$\frac{1}{S} = \frac{\Delta E}{E}$$

where E is voltage; and the brightness steps as $$\frac{1}{C} = \frac{\Delta b}{b}$$

Therefore $$f = f_N \frac{\log \frac{\Delta E}{E}}{\log \frac{\Delta b}{b}}$$

A primary object of this invention is to minimize the signal band width required for the transmission of intelligence.

Another object of this invention is to transmit a greater number of signals representative of different intelligences within a predetermined signal pass band.

Another object of this invention is to provide an improved system for the transmission of intelligence with a minimum signal band width.

Another object of this invention is to provide for the reproduction of signal intelligence transmitted by an arrangement requiring a minimum signal band width.

A still further object of this invention is to provide for the transmission of image signals by employing a minimum band width.

Other and incidental objects of the invention will be apparent to those skilled in the art from a reading of the following specification and an inspection of the accompanying drawing in which:

Figure 1 and Figure 2 illustrate graphically the fundamental theory upon which this invention is based;

Figure 3 shows one form of this invention employed in the transmission of television image signals;

Figure 4 illustrates one form of this invention as applied to the reproduction of television images;

Figure 5 illustrates schematically one form of signal divider suitable for employment in the operation of this invention;

Figure 6 shows in plane view the mask employed in the tube shown schematically in Figure 5;

Figure 7 illustrates by circuit diagram a signal divider suitable for employment in a transmitter circuit of the type illustrated in Figure 3; and Figure 8 shows in circuit diagram a suitable signal divider applicable to the receiving system outlined in Figure 4.

Turning now in detail to Figure 1, there is shown graphically an assumed signal amplitude 1 which is divided into two equal parts representing "A" white and "A" black. It is intended to illustrate that if the signal amplitude is at any position higher than its mid-point, the first intelligence, which is represented by "A," is white, while if the amplitude of the signal is anywhere in its lower section, the "A" intelligence is black.

It then becomes possible to divide the upper half, or the section representing "A" white, into two portions so that any amplitude included in the upper quarter represents the white portion of intelligence "B." If, however, the signal is included in the third quarter from the bottom, "A" intelligence is white, but the "B" intelligence is black.

It will be seen, therefore, that by further dividing the amplitude into various sections, additional intelligences may be transmitted. For example, if the signal amplitude has a level such as indicated at "3" in Figure 1, it is indicative of a white intelligence "A," a white intelligence "B," a white intelligence "C," and a black intelligence "D."

Turning now to Figure 2, there is illustrated one form of this invention wherein the signal amplitude is divided into a greater number of steps than two. The intelligence "E," for example, may be divided into three or more steps, while the intelligence "F" may also be divided into three or more steps. It is not necessary that both intelligences be divided equally, nor is it necessary that even a multiple division be limited to two intelligences, as illustrated in Figure 2, but the signal amplitude may be divided to represent more than two intelligences.

Turning now in detail to Figure 3, there is shown a pair of television cameras 5 and 7 which, for the purpose of example, are both focused on object 9. Television cameras 5 and 7 may be arranged to pick up alternate or different scanning lines. The cameras 5 and 7 may be employed in a color system, each picking up a different selected component color, or they may be employed in a three-dimensional system in any of the well known manners. In its application to color, it is perhaps preferable that three color separation be employed. In the form shown, the light from the image is divided by plate 11 which is, for example, a half-silvered mirror employed to divide the light from object 9 between television cameras 5 and 7. Cameras 5 and 7 may take any of the well known forms, such as, for example, the image orthicon camera, which is shown and described in an article entitled "Image orthichon camera," by R. D. Kell and G. C. Sziklai, published in the "RCA Review" for March 1946. The iconoscope is another suitable camera type. The iconoscope is shown and described in the "Proceedings of the Institute of Radio Engineers" in an article entitled "Theory and performance of the iconoscope," beginning on page 1071 of the issue for August 1937.

Signals from television camera "A" illustrated by blocks 5 are applied to a beam deflection plate 13 of cathode ray tube 15. The cathode ray tube 15 differs in one very important respect from the popular cathode ray tubes. This difference is in the shape of the electron beam 17. It will be seen from the drawing that beam 17 takes the form of a ribbon extending the width of the target 19, but having an extremely small depth or thickness. Such a beam may be formed in the shape of a ribbon, as illustrated, or in the shape of a fan. The gun structure 21 is designed to properly shape the beam. The detail of the gun 21 is not believed necessary, in view of the many published papers on electron guns.

By application of the signal from television camera "A" to deflecting plate 13, it will be seen that the position of intersection of the beam 17 on target 19 is governed by the signal train which is applied to the deflecting plate 13 from camera "A." It will also be seen that the masking element 23 shades the beam 17 from target 19 to produce a step-like signal from target 19. For purposes of example, the mask 23 is arranged to produce only three separate amplitudes in response to the signals from camera "A" regardless of the intermediate variations in amplitude of the signal derived from television camera "A." It will thus be seen that the image signal of television camera "A" is divided into three amplitudes. More steps may, of course, be employed. Three steps are chosen as an example for illustration.

The signal derived from electrode 19 as a result of the action of the electron beam 17 is applied to the control electrode of tube 25. This signal applied to tube 25 is combined or mixed at point 27 with the signal from television camera "B," illustrated as block 7. The signal from television camera "B" illustrated in block 7 is combined with the signal from television camera "A" at point 27 after passing through the mixer tube 29.

It is important, however, that the maximum amplitude of the signal from television camera "B" be ⅓ the amplitude of the signal applied to point 27 as a result of television camera "A." This will permit the total signal amplitude variation resulting from television camera "B" to be included in any one of the steps of the signal coming from television camera "A" as a result of the steps of the mask 23 in tube 15.

For purposes of illustration, let it be assumed, for example, that the signal from television camera "A" remains constant so that the beam 17 remains substantially at the position shown. During the same time interval, the signal from television camera "B" varies between zero signal and its maximum amplitude. The combined signal at point 27 will then vary, not over its full amplitude range, but only through a maximum range equivalent to one step of mask 23.

The combined signal at point 27 may also include the usual defletcion synchronizing pulses normally employed in television systems and, for purposes of illustration, a deflection synchronizing signal generator 31 is illustrated by block to furnish the necessary deflection sync signal to the cameras "A" and "B" and to the mixer tube 33 for combination with the video signals at point 27.

Turning now in detail to Figure 4, there is illustrated one form of television image receiving arrangement applicable to receive and reconstruct images transmitted by a transmission system of the type shown in Figure 3.

A television receiver 35 is illustrated in block, as it may take any of the well known forms. Typical television receivers having electrical circuits suitable for employment in the operation of this invention are shown and described in a book entitled "Television" by Zworykin and Morton, published by Wiley & Sons in 1940.

A very important difference between the usual television receiver and that illustrated in block 35, however, exists. It is necessary in the practice of this invention to have in one of its forms a special image reproducing tube 37. Tube 37 has a pair of electron guns 39 and 41, together with associated independent control electrodes 43 and 45. Control electrode 45 controls electron beam 47, which intersects the screen 49 at a different position, for example, than electron beam 51, which is controlled by control electrode 43. The difference in position of beams 47 and 51 on target 49 may, for example, be alternate lines of a television image, providing, of course, the transmitting system is so arranged that television cameras "A" and "B" scan alternate lines.

In another form of this invention, the lines of intersection of beams 47 and 51 of tube 37 are so arranged with different color producing phosphors or color filters to produce different colors. In such an arrangement, television cameras "A" and "B" of Figure 3 are each employed to produce a color separation image. In still another form of the invention, the separated signals are employed in a color system utilizing the trinoscope as illustrated and described in the article entitled "Simultaneous all-electronic color television," beginning on page 459 of the "RCA Review" for December 1946.

It is necessary in the practice of this invention that the signal obtained from television receiver 35 be properly divided into the designated intelligence signal trains. In accordance with one form of this invention, this is accomplished by the employment of signal dividers shown in block as signal dividers 53 and 55. Detail regarding one suitable type of signal divider is illustrated in Figure 5.

The operation of the system shown in Figure 4 will better be understood by a reference to the signal divider shown in Figure 5.

In Figure 5, a cathode ray tube 57 includes a special beam forming gun 59, which generates a ribbon type beam 61 directed at a target composed of element 63 and element 65. A mask 67 is positioned between the targets 63 and 65 and electron gun 59. Beam 61 is deflected vertically by the signal applied to deflecting plate 69.

It will be seen, after consideration of an explanation of the operation of tube 15 in Figure 3, that the signal output of target 63 of tube 57 of Figure 5 or signal "A" is dependent upon the vertical deflection of the beam 61. It will be seen, however, that the signal "A" consists of only three separate and distinct amplitudes which correspond to the signal amplitudes derived from tube 15 of Figure 3 as a result of mask 23.

The right side of the mask 67, however, contains wedge shapes, as illustrated clearly in the plane view of mask 67 of Figure 6. It will be seen that if the electron beam 61 is deflected such that it varies in any one of the steps of mask 67, the signal "B" derived from target 65 will vary, while the signal "A" from target 63 will not vary.

If the control electrode 45 of tube 37 of Figure 4 is connected to receive signal "A" from target 63, while control electrode 43 is connected to receive signal "B" from target 65, electron beams 47 and 51 will be controlled in accordance with the signal obtained from television camera "A" and television camera "B" of Figure 3. The original image 9 of Figure 3 can therefore be reproduced on screen 49 of Figure 4.

Although tube 37 of Figure 4 and tube 57 of Figure 5 are illustrated as single envelope tubes, according to other forms of the invention, tube 57 is divided into two tubes positioned to form images in optical registry. Tube 57 of Figure 5 is divided into two tubes with two beams.

Turning now in detail to Figure 7, there is shown a signal input circuit for both signal intelligence "A" and signal intelligence "B," which may be image information or any other type of information which it is desired to transmit.

Signal intelligence "A" is diveded into three separate and distinct amplitudes by tubes 71, 73 and 75, which consist, in the form of the invention shown, of dual triodes having sharp cut-off characteristics. Additional tubes may be provided if additional steps are desired. Signal intelligence "A" is applied through resistors 77, 79 and 81 to the control electrodes of the first section of tubes 71, 73 and 75. The cathodes of both sections of the tubes 71, 73 and 75 are connected to each other as shown, and a fixed bias potential is connected to the control electrodes of the second half of tubes 71, 73 and 75. The amount of bias for each tube will determine the point of cut-off and hence the predetermined amplitude value.

The tubes 71, 73 and 75 operate to convert signal intelligance "A" into three separate amplitudes in the following manner. The positive bias applied to the control electrode of the second half of tube 75 causes the cathode of the first half to rise to such a positive value as to cut off tube 75 until the incoming signal reaches a sufficiently positive value to cause the first half of tube 75 to take over. When the incoming signal has reached a sufficiently positive value to cause the first half of tube 75 to take over, the output or second half of tube 75 ceases to draw current because of the rise in cathode potential, and therefore the current of tube 75 is eliminated from the system. The same action is taken by tube 73. When the incoming signal has reached a sufficiently high positive value to cause the first half of tube 73 to draw current, the second half of tube 73 ceases to draw current and thus eliminates it from the system. There is no change in signal in the output circuit of tubes 71, 73 and 75 unless the output or second section of any of tubes 71, 73 and 75 is biased in or out of the circuit, and this is done only by action of their associated first section. It will be seen, therefore, that signal intelligence "A," regardless of its amplitude, is limited to three separate and distinct amplitudes for transmission to tube 83.

Signal intelligence "B," however, is transmitted directly through tube 85 to tube 83 to be combined with the signal obtained from tubes 73, 71 and 75.

It is again important, however, that the overall amplitude obtained from tube 85 does not exceed the range included in one step of the signal obtained from the tubes 71, 73 and 75.

Tubes 87, 89 and 91 are arranged to convert the incoming signal into amplitudes having only predetermined values. If no incoming signal is applied, the second half section of tubes 87, 89 and 91 is conducting. If, however, the incoming signal reaches in a positive direction a predetermined amplitude, the second section of tube 91, will become nonconducting and in effect will be dropped from the output circuit. Likewise, when the signal gets up to the second predetermined level, the second section or output section of tube 89 will drop from the circuit, and when the signal has reached a third predetermined value, the second section of tube 87 will be dropped from the circuit. The signal obtained from tubes 87, 89 and 91 is applied to the cathode of tube 93 through a suitable direct current connection involving battery 95.

The incoming signal is also applied to the control electrode of tube 97, which furnishes intelligence "A." Tube 93 furnishes in its output circuit intelligence "B."

It will be seen in the type of system shown in Figure 8 that the intelligence "A" may be caused to vary, not only in its large increments, but also in the information of intelligence "B." It will be remembered, however, that the small variation added to intelligence "A" as a result of the change caused by intelligence "B" is too small to cause noticeable error, that is, of great enough increments to be recognizable, and thus may be included without trouble. In the form of the invention shown in Figures 4 and 5, however, this error signal is not included.

It will be seen from the above explanation of the operation of this invention that any signal amplitude may be divided into a predetermined number of designated amplitude values representative of a first intelligence. Each division of the signal amplitude may again be divided into a predetermined number of designated amplitude values corresponding to a second intelligence. In the receiving system, an arrangement is provided whereby the first intelligence is separated from the signal in a manner which recognizes only amplitude changes between the designated amplitude values representative of the first intelligence and is not influenced by any lesser change of signal, such as the change in signal between the designated amplitude values corresponding to the second intelligence.

The process may be repeated for additional intelligences.

Having thus described the invention, what is claimed is:

1. A quantizing tube comprising in combination, a plurality of electrically independent cathode ray target areas, a cathode ray gun, and a cathode ray shield positioned between said target areas and said gun, said cathode ray shield having an edge with a step-like form and an edge with a sawtooth form, both forms of substantially equal frequency positioned in a plane parallel to the plane of said target areas, said step-like form edge positioned to shadow one of said target areas from said gun, and said sawtooth form edge positioned to shadow another of said target areas from said gun.

2. A quantizing tube comprising in combination, a plurality of electrically independent cathode ray target areas, a cathode ray gun, said gun arranged to produce a beam which is fan-like in form, and a cathode ray shield positioned between said target areas and said gun, said cathode ray shield having an edge with a step-like form and an edge with a sawtooth form, both forms of substantially equal frequency positioned in a plane parallel to the plane of said target areas, said step-like form edge positioned to shadow one of said target areas from said gun, said sawtooth form edge positioned to shadow another of said target areas from said gun, and means to deflect said beam in a direction perpendicular to its broadest dimension along said steps and along said sawtooth form.

References Cited in the file of this patent

UNITED STATES PATENTS

| Number | Name | Date |
|---|---|---|
| 1,745,018 | Korn | Jan. 28, 1930 |
| 1,747,978 | Kalgelman | Feb. 18, 1930 |
| 1,757,345 | Strobel | May 6, 1930 |
| 1,769,920 | Gray | July 8, 1930 |
| 2,272,070 | Reeves | Feb. 3, 1942 |
| 2,313,209 | Valensi | Mar. 9, 1943 |
| 2,405,252 | Goldsmith | Aug. 6, 1946 |
| 2,425,066 | Tobin | Aug. 5, 1947 |
| 2,429,616 | Grieg | Oct. 28, 1947 |
| 2,429,631 | Tobin | Oct. 28, 1947 |
| 2,437,707 | Pierce | Mar. 16, 1948 |
| 2,438,709 | Labin et al. | Mar. 30, 1948 |
| 2,438,908 | Goodall | Apr. 6, 1948 |

FOREIGN PATENTS

| Number | Country | Date |
|---|---|---|
| 505,653 | Great Britain | May 11, 1939 |
| 647,468 | Germany | July 5, 1937 |

OTHER REFERENCES

"Electrical Communication," 1947, pages 287 to 296.